(12) United States Patent
Wieler

(10) Patent No.: US 10,342,359 B2
(45) Date of Patent: Jul. 9, 2019

(54) BED SYSTEM FOR TRAPPING CRAWLING INSECTS

(71) Applicant: Leon Wieler, Winnipeg (CA)

(72) Inventor: Leon Wieler, Winnipeg (CA)

( * ) Notice: Subject to any disclaimer, the term of this patent is extended or adjusted under 35 U.S.C. 154(b) by 238 days.

(21) Appl. No.: 15/120,632

(22) PCT Filed: Feb. 20, 2015

(86) PCT No.: PCT/CA2015/050131
§ 371 (c)(1),
(2) Date: Aug. 22, 2016

(87) PCT Pub. No.: WO2015/123780
PCT Pub. Date: Aug. 27, 2015

(65) Prior Publication Data
US 2017/0065095 A1   Mar. 9, 2017

Related U.S. Application Data

(60) Provisional application No. 61/942,198, filed on Feb. 20, 2014.

(51) Int. Cl.
*A47C 31/00* (2006.01)
*A01M 1/10* (2006.01)
(Continued)

(52) U.S. Cl.
CPC ............ *A47C 31/007* (2013.01); *A01M 1/103* (2013.01); *A01M 1/14* (2013.01); *A01M 1/20* (2013.01);
(Continued)

(58) Field of Classification Search
CPC ........ A01M 1/103; A01M 1/14; A01M 1/145; A01M 1/20; A01M 1/2027; A01M 1/2055;
(Continued)

(56) References Cited

U.S. PATENT DOCUMENTS 6,584,627 B1 * 7/2003 Yang .................... A47C 19/021
5/174
2004/0078896 A1 * 4/2004 Hellyer ................ A47C 19/005
5/400

(Continued)

FOREIGN PATENT DOCUMENTS

CA        2728024      7/2012
CA        2770734     11/2012

*Primary Examiner* — Eric J Kurilla
(74) *Attorney, Agent, or Firm* — Ryan W. Dupuis; Ade & Company Inc.; Kyle R. Satterthwaite

(57) ABSTRACT

A bed system for the inspection and treatment of crawling insects, for example bed bugs, includes a main support panel and at least one movable mattress panel upon the main support panel to define a crevice between the panels for harboring crawling insects for subsequent inspection and treatment. A sleeping mattress is then supported on the mattress panel. The support panel is supported above a supporting surface, for example the floor or a boxspring mattress, by a spacer frame. The support panel further includes a skirt member extending down from the perimeter edge of the support panel by a height of the spacer frame so that the bottom free edge of the skirt member is in close, non-contacting proximity to the supporting surface. Treatment chemicals may optionally be provided in the space below the main support panel which is defined by the spacer frame mounted between the supporting surface and the main support panel.

15 Claims, 4 Drawing Sheets

(51) Int. Cl.
*A01M 1/14* (2006.01)
*A01M 1/20* (2006.01)
*A47C 19/02* (2006.01)

(52) U.S. Cl.
CPC ........ *A01M 1/2027* (2013.01); *A01M 1/2055* (2013.01); *A47C 19/025* (2013.01)

(58) Field of Classification Search
CPC ..... A47C 19/02; A47C 19/021; A47C 19/025; A47C 31/007; A47G 2009/001; A47G 9/0292
See application file for complete search history.

(56) References Cited

U.S. PATENT DOCUMENTS

| | | | |
|---|---|---|---|
| 2010/0043275 A1* | 2/2010 | Battick | A01M 1/14 43/114 |
| 2011/0107654 A1 | 12/2011 | Wieler | |
| 2012/0137433 A1* | 6/2012 | Snell | A47C 31/007 5/493 |
| 2012/0167307 A1* | 7/2012 | Michael | A47C 31/105 5/501 |
| 2012/0291337 A1* | 11/2012 | Curcio | A01M 1/14 43/114 |
| 2013/0000038 A1* | 1/2013 | Schulz, Jr. | A47C 19/025 5/400 |
| 2013/0111671 A1* | 5/2013 | Smithson | A47C 27/122 5/690 |

* cited by examiner

BED SYSTEM FOR TRAPPING CRAWLING INSECTS

FIELD OF THE INVENTION

The present invention relates to a bed system for supporting a mattress thereon above a floor such that crawling insects are trapped on the bed system between the floor and the mattress, and more particularly the present invention relates to a bed system including i) trap members defining trapping barriers about each leg of a frame of the bed system and ii) a perimeter crevice between the mattress and the trap members arranged to receive crawling insects therein which is accessible for inspection and which can be readily sealed for transport to a remote treatment location.

BACKGROUND

Ridding hotel rooms, or any other unused room, of bed bugs is a difficult project. The two main related problems are that bed bugs often tend to remain in established harbourages until a host is present and bed bugs are becoming resistant to the pesticides currently on label for bed bugs. The result is the bugs, in an unused room, can remain hidden in the established harbourages for months without moving rendering any pesticide treatment ineffective. And given the increased levels of pesticide resistance the bugs may survive single crossings of even fresh residual layers. Even if the pesticide exposure is sufficient to be lethal the bug may survive long enough to feed on a newly introduced host. In a hotel setting that is a disaster.

The current standard treatment plans for bed bugs in hotel settings is to use encasements on the mattress and box spring preventatively which removes most of the harbourage area from the bed. The bugs will then harbour off the bed in baseboards, headboards, surrounding furniture, and other unknown areas which are more difficult to inspect or treat. The result is the infestations become larger and more diffused before they are noticed making the infestation more difficult to treat. Furthermore the room is left empty for 3 weeks after chemical treatment which will result in a certain percentage of bugs looking for a blood meal in neighbouring rooms and a larger percentage remaining in the harbourages waiting for a new host. Both scenarios are a disaster.

It would be preferable to encourage bed bugs to harbour in areas that are easily inspected for bed bugs and easily treated when they are noticed. Areas of the hotel room that are more difficult to address such as baseboards and electrical plugs should be sealed preventatively to discourage bed bug harbourage. If all or most of the bugs could be contained within a bed frame supporting a mattress thereon, then the inspection and treatment process could be greatly enhanced which, in turn, would create better treatment outcomes. Easy inspections allow the inspections to take place more frequently and economically which, in turn, reduces the risk of renting infested rooms and potential law suits.

A further use would be in dormitories, homeless shelters, and other areas with high risk clients.

SUMMARY OF THE INVENTION

According to a first aspect of the present invention there is provided a bed system for supporting a mattress on a supporting surface, the system comprising:

a mattress supporting assembly including a support panel and a mattress supporting surface above the support panel which is adapted to receive and support the mattress thereon;

a spacer frame below the support panel so as to be arranged to support the support panel of the mattress supporting assembly spaced above the supporting surface; and a skirt member suspended from a perimeter of the mattress supporting assembly;

the skirt member having a height which is near a height of the spacer frame such that a bottom free edge of the skirt member is arranged to be located in proximity to the supporting surface in a non-contacting relationship with the supporting surface.

In one embodiment, i) the supporting surface comprises a rigid sheet having a perimeter edge and ii) the bottom free edge of the skirt member is in proximity to the perimeter edge of the rigid sheet. In some instance, the rigid sheet is supported directly onto a box spring mattress.

Preferably the skirt member and the mattress supporting assembly are removable together from the rigid sheet and the spacer frame supported on the rigid sheet. This may be accomplished by i) the spacer frame being fixed relative to the rigid sheet, ii) the skirt member being fixed relative to the mattress supporting assembly, and iii) the support panel of the mattress supporting assembly being fastened to the spacer frame with removable fasteners.

Preferably the skirt member is laterally outward in relation to the perimeter edge of the rigid sheet and the bottom free edge of the skirt member is lower in elevation than a top side of the rigid sheet.

When the support panel is elongated in a longitudinal direction and is generally rectangular so as to comprise two longitudinal sides and two lateral ends at respective opposing ends of the two longitudinal sides, the skirt member preferably extend along both longitudinal sides and at least one lateral end of the perimeter of the mattress supporting assembly.

In the instance of the frame being supported on a rigid sheet on a box spring matter, the overall height of the mattress support assembly and the skirt member is preferably less than four inches, and more preferably less than 2 inches.

In other embodiments, the supporting surface referred to above upon which the bed system is supported instead comprises the floor. In this instance the spacer frame has a height which is greater than the skirt member such that the bottom free edge of the support member is arranged to be supported in proximity to but spaced upwardly from the floor.

In this instance, the spacer frame may include a plurality of legs and accordingly the bed system may further comprise a trap member associated with each leg of the frame so as to define a crawling insect barrier fully surrounding the leg between the leg and the floor.

In either embodiment, the bed system may further include a mat of fibrous material arranged to be received within a gap between the support panel and the supporting surface. The fibrous material is preferably coated with a material selected from the group consisting of a residual pesticide, and/or a desiccant material.

The mattress assembly preferably further includes at least one mattress panel supported on the support panel of the skirt member such that a crevice is defined between the support panel of the skirt member and said at least one mattress panel of the mattress supporting surface, wherein: i) the crevice extends about a full perimeter of the mattress supporting assembly; and ii) the crevice is arranged to receive crawling insects therein such that the crawling insects must transverse the crevice to reach the mattress supporting surface from the frame.

In the illustrated embodiment there is provided a plurality of mattress panels abutted with one another in the working position at respective seams such that the crawling insects are unable to pass through the seams.

Preferably a slippery surface is provided below the crevice about a full perimeter thereof which is arranged to be upwardly climbable by bed bugs but is arranged to resist downward climbing by bed bugs, and a tapered edge is provided above the crevice about a full perimeter thereof.

According to a second aspect of the present invention there is provided a bed system for being supported on a supporting floor, the system comprising:

a frame arranged to be supported on the supporting floor and defining a support panel thereon spaced above the supporting floor;

a mattress supporting surface supported above the support panel by a plurality of spacers such that:

a mattress is arranged to be supported on the mattress supporting surface; and a crevice is defined between the mattress supporting surface and the support panel of the frame about a full perimeter thereof which is arranged to receive crawling insects therein such that the crawling insects must transverse the crevice between the support panel of the frame and the mattress supporting surface.

Preferably the mattress supporting surface is defined by at least one mattress panel which is supported for movement relative to the support panel on the frame between a working position in which the mattress is arranged to be supported thereon and an open position in which the crevice is readily accessible for inspection.

According to another aspect of the present invention there is provided a method of treating bed bugs comprising:

providing a supporting surface;

providing a bed system on the supporting surface, the bed system including i) a support panel, ii) a spacer frame supporting the support panel spaced above the supporting surface, and iii) a skirt member suspended from a perimeter of the support panel such that a bottom free edge of the skirt member is in proximity to the supporting surface and in a non-contacting relationship with the supporting surface;

supporting a mattress above the support panel; and applying a material selected from the group consisting of a residual pesticide and a desiccant material to a space between the support panel and the supporting surface.

When the supporting surface comprises a rigid sheet having a perimeter edge arranged such that the bottom free edge of the skirt member is in proximity to the perimeter edge of the rigid sheet, and the method may further include supporting the rigid sheet on a top side of a box spring mattress.

According to another aspect of the present invention there is provided a bed system for being supported on a supporting floor for trapping crawling insects, the system comprising:

a frame arranged to be supported on the supporting floor and defining a support panel thereon above the supporting floor;

a mattress supporting surface supported above the support panel by a plurality of spacers such that:

a mattress is arranged to be supported on the mattress supporting surface; and a crevice is defined between the mattress supporting surface and the support panel of the frame about a full perimeter thereof which is arranged to receive crawling insects therein such that the crawling insects must transverse the crevice between the support panel of the frame and the mattress supporting surface.

Preferably the mattress supporting surface is defined by at least one mattress panel which is supported for movement relative to the support panel on the frame between a working position in which the mattress is arranged to be supported thereon and an open position in which the crevice is readily accessible for inspection.

According to a further aspect of the present invention there is provided a method of trapping crawling insects comprising:

providing a bed system including i) a frame arranged to be supported on a floor, ii) a support panel on the frame so as to be supported above the floor, iii) a mattress supporting surface supporting a mattress thereon above the support panel, and iv) a plurality of spacers between the support panel and the mattress supporting surface so as to define a crevice between the mattress supporting surface and the support panel of the frame about a full perimeter thereof that crawling insects must transverse between the support panel of the frame and the mattress on the mattress supporting surface;

inspecting the crevice for crawling insects by displacing at least a portion of the mattress supporting surface relative to the support panel.

The method preferably further includes sealing the crevice between the mattress supporting panel and the support panel about the full perimeter and transporting the sealed crevice to a remote location for treatment in response to detection of crawling insects in the crevice.

According to another aspect of the invention there is provided a bed system for being supported on a supporting floor for trapping crawling insects, the system comprising:

a frame including a plurality of legs arranged to be supported on the supporting floor;

a mattress supporting surface on the frame arranged to support a mattress thereon;

a skirt member suspended on the frame at a perimeter location spaced laterally outwardly from the legs, the skirt member extending downwardly from the frame towards a bottom free edge arranged to be located in proximity to the supporting floor; and a trap member associated with each leg of the frame so as to define a crawling insect barrier fully surrounding the leg between the leg and the supporting floor upon which crawling insects are arranged to be trapped;

the skirt member being movable relative to the frame between a working position in which the trap members are inaccessible and hidden by the skirt member and an open position in which the trap members are readily accessible for inspection and replacement.

The skirt member is supported on the frame such that the bottom free edge remains separated from the supporting floor by a gap therebetween, or alternatively the bottom free edge of the skirt member comprises a slippery surface which is unclimbable by bed bugs such that the crawling insects must traverse the trap members to access a mattress on the frame.

The bed system according to the present invention preferably has the following features:

i) The bed is constructed with no incidental cracks or crevices in which bugs can hide without being easily inspected.

ii) The bed is finished in a light color which allows easy inspections for bed bugs.

iii) The bed is finished in a material that allows bugs to easily climb up but have difficulty climbing down (such as varnish). Given that bed bugs dislike climbing down slippery surfaces this encourages bugs to stay on the bed.

iv) The area directly below the mattress contains an easily inspected narrow crack/crevice constructed of substrates that bugs prefer. The area directly below this crack is made of a material that bugs normally dislike and slippery enough to discourage bed bugs from climbing down but offering enough traction for the bug to climb up. The combination of creating an ideal harbourage surrounded by substrates that bed bugs dislike encourages the bugs to harbour in the ideal harbourage. Alternately the area directly below the crack/crevice (ideal harbourage) can be wrapped in plastic packing tape which bed bugs can not traverse at all. This further encourages bugs to stay on the bed but does dissuade bugs that have made it onto the side of the bed from accessing a blood meal and subsequently hiding in the crevice. These bugs may be more readily visible to human occupants in the morning which may be a problem. The area directly below the crack must have no sharp corners as bed bugs can use corners as an aid in climbing down.

v) The crack listed above is created by placing two pieces of material, such as plywood (or cloth/paper covered plywood), together with a narrow bed bug sized spacer between them. A hinge can be placed on one side (or multiple sides) to allow the crack to be opened like a book which in turn allows easy inspection for bed bugs.

vi) The box spring and mattress are both encased with tight fitting encasements without folds in which bed bugs can harbour.

vii) Taken as a whole the above creates a system by which bed bugs are encouraged to harbour in an area of the bed that can be easily localized, inspected, treated, and which hotel guests can not access.

According to some embodiments, a secondary inspection device/trap consists of placing glue boards beneath the legs of the hotel bed. If a bed bug is introduced to the hotel room the bug must first cross the glue board barrier under the bed leg to access a sleeping host. The ideal glue board trap must contain a very sticky glue on a very slippery substrate. When a bug places a leg on the glue the slippery substrate surrounding the glue prevents the bed bug from gaining traction sufficient to escape the predicament. The glue board must be flat on the ground (or a gradual rise to a slightly raised platform) because any sudden increase in elevation causes the bed bug to approach the glue board in a very tentative manner which inhibits a solid contact with the glue. Another helpful feature is to cut an existing glue board with a sharp knife so that all 4 sides have a freshly cut edge. The glue on the cut edge has a thickness which adds to the amount of glue available to trap bugs on the very edge of the glue board. The freshly cut glue may also be stickier than the other parts of the glue which can be helpful. The inventor's unpublished studies showed that the cut/modified glue boards are more effective than unmodified glue boards and were 8.5 times (34 to 4) more likely to trap a bed bug than the industry standard climb up interceptor in head to head comparisons. The bugs are normally caught on the very edge of this glue board so increasing the stickiness and the amount of exposed glue in this area is helpful. The entire cut glue board is then placed on a slippery substrate (such as slippery plastic packing tape) which in turn is placed under the bed legs via a small dish that fits over the bed leg. These contraptions, due to their strategic placement, are far superior to random glue board traps in terms of monitoring for bed bugs and can then be inspected periodically to see if bed bugs are present in the room. A further advantage is that bugs caught in these traps will never be seen by guests and be unable to reproduce.

A further optional control method is to place a rough cloth with many thin strands of thread standing vertically under the bed and around the glue board traps. An example of this cloth is a burlap cloth that has been combed with a steel wire brush. This material is then coated with a dust pesticide such as cyfluthrin dust or pyrethroid dusts, or even desiccant dusts including Diatomaceous Earth and the like. Studies show that even the most pesticide resistant bed bug will die within 24 hours of full time contact with cyfluthrin dust. When bed bugs attempt to traverse the brushed burlap the bugs often brush against the pesticide coated strands and stumble over the uneven surface and fall causing their bodies to be coated with the dust. My own studies showed that bed bugs exposed to a brushed burlap cloth coated with cyfluthrin dust died or were immobile within 12 hours—even if they were no longer in contact with the cloth. Some of the bugs died within 30 minutes.

A further advantage to combining the glue board traps with the pesticide coated cloth is that they work synergistically. Bed bugs, to obtain a blood meal, must traverse a pesticide coated cloth that imparts a lethal dose of dust to their bodies in a very short period of time. Therefore bugs would not survive even this single trap. Bugs that have pyrethroid poisoning are also more unstable and take more risks in attempting to access a blood meal. These poisoned bugs will walk headlong into the glue boards to be permanently caught and thus avoid any potential exposure to guests. Even if the bugs are caught by a single leg the bugs begin to lose motor control and are even more unlikely to work themselves free of the glue trap. If the bug did free itself of the glue board the only escape is to walk over the poisoned cloth again. Given that bed bugs will repeatedly search for a way up to the host the constant exposure to the pesticide cloth will ensure death.

Of course glue boards and burlap strips of cloth would not be very aesthetically pleasing or safe if those items were openly placed under the bed. Therefore a cover is placed over the bed which protects the glue boards and pesticide cloth from dust and prying fingers. The cover is resting on the bed and reaches down far enough to the floor to protect the area under the bed but far enough off the ground to prevent the bug from touching the cover. Depending on the floor a three eighths inch to three quarter of an inch space between the floor and the cover would be adequate. To further decrease the space between the floor and the cover the bottom inch of the cover could be covered in a slippery surface bugs can not climb such as plastic packing tape to prevent access to the bugs. This method could have portions of the cover touch the floor to further prevent dust and fingers from gaining access but the disadvantage would be the bugs might spend too much time attempting to unsuccessfully access that spot and spend less time traversing the pesticide cloth and glue boards. The cover could be painted a color which bed bugs prefer such as black or red. The semi-slippery edge directly under the crack could be painted white or yellow to further push the bugs into the crack.

The area surrounding the headboard also needs special consideration. Most hotel rooms have the headboard mounted directly to the wall with the bed pushed against the headboard. Bed bugs could simply avoid the burlap cloth and glue boards and climb the wall to access a blood meal. Therefore a half inch thick spacer four inches smaller than the headboard is screwed to the wall directly behind the headboard. The spacer edges are wrapped with slippery packing tape and are then sealed to prevent any access behind the spacer. Accordingly a perimeter of the spacer defines a slippery surface boundary that bugs must cross to access the headboard from the wall. A top side of the spacer is preferably provided with a sharply inclined surface which extends at an upward inclination from the outer side of the spacer that is against the wall to the inner side of the spacer that is joined to the headboard. Other portions of the perimeter of the spacer, including the bottom and laterally opposed sides, may be similarly sloped in addition to being a slippery surface. My private experiments have found that bed bugs cannot climb a slippery surface such as clear plastic packing tape. Therefore strips of clear packing tape should be stuck on the wall next to the spacer. The headboard is then placed onto the spacer which hides the packing tape. The packing tape prevents the bugs from accessing or leaving the headboard. Bed bugs attempting to access the bed via the head board are repelled from the plastic tape and are forced onto the burlap cloth and glue boards. To keep the bugs away from the head board area the plastic tape can be extended all along the baseboard by the headboard. Bed bugs would rather walk toward a host than away from a host so once again the bugs are met by the burlap and glue traps.

The void under the box spring and the glue boards can be inspected regularly for bed bugs to ensure the guests have a bug free experience. If bugs are found the infestation will be, depending on the frequency of inspections, relatively small which, even in an ordinary bed setting, results in most of the bugs in the suite being on the bed. With the Sleep Tight bed all the bugs have been pushed into the ideal crack/crevice which further ensures all the bugs are on the bed. The entire bed and all the furniture is then wrapped in cellophane plastic and carried to a waiting Sleep Tight sterilization trailer. The trailer has sufficient power and insulation levels that even electronics can be safely sterilized. The floor of the room is steam vacuumed, closet areas steamed, and the furniture is replaced with spare furniture and beds. The room can then be brought back into service within an hour.

The rest of the furniture in the room can also have bits of corrugated cardboard stapled under the drawers, behind the legs, and other inconspicuous areas. If bugs are imported into the room and have not yet relocated to the bed these other areas can act as ready made harbourages. The furniture can then be heat sterilized as well. In a room with sealed baseboards and electrical plugs this arrangement ensures the maximum amount of bugs are removed from the suite via the furniture.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
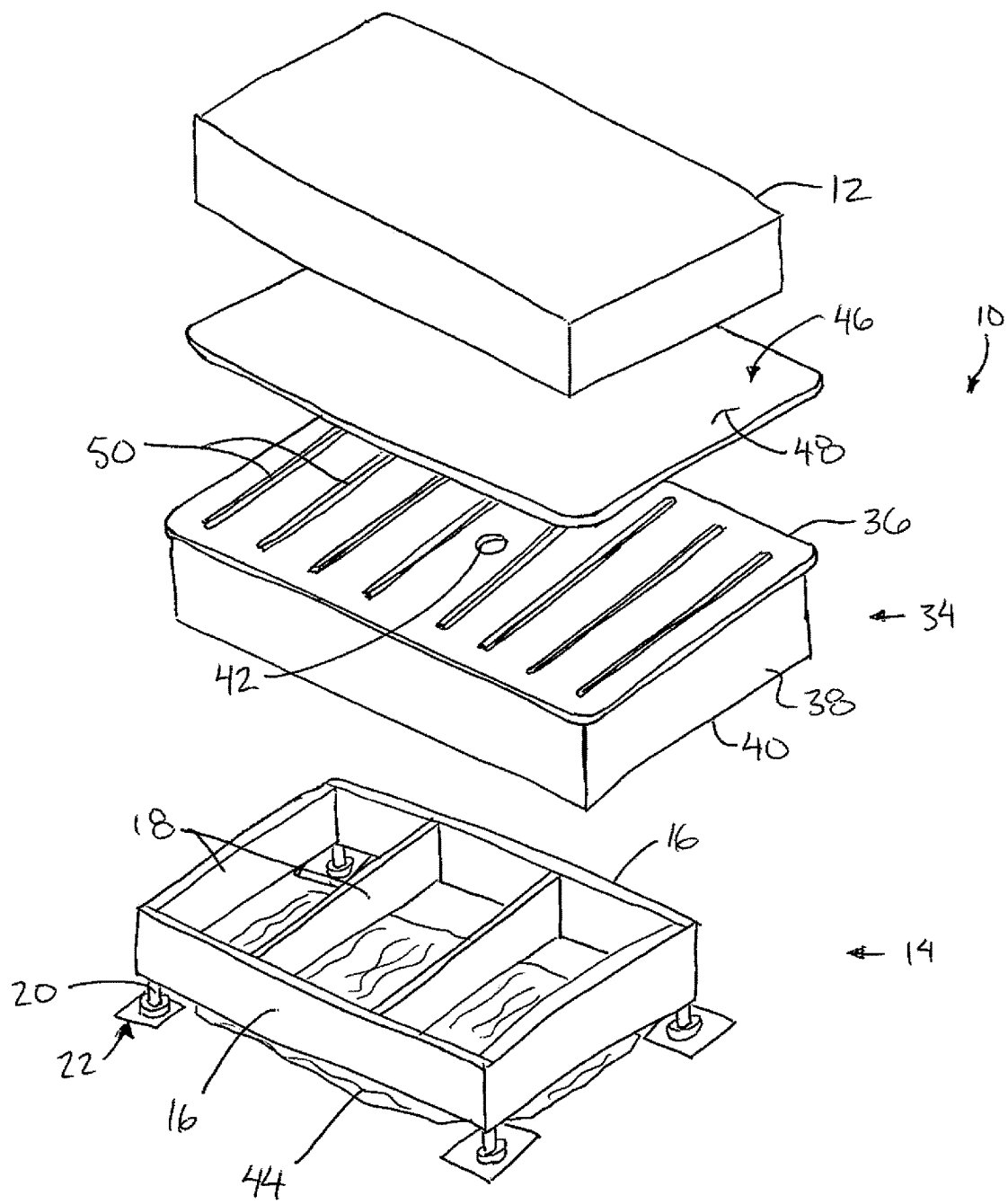
FIG. 1 is an exploded perspective view of the bedbug system according to the present invention.

Referring to the accompanying figures, there is illustrated a bed system generally indicated by reference numeral 10. The bed system 10 is arranged for supporting a mattress 12 above a supporting surface 13, for example above the floor or above an upper surface of a box spring mattress, for guarding against and trapping crawling insects, and more particularly bedbugs.

Although various embodiments of the present invention are shown in the accompanying figures, the common features of the various embodiments will first be described herein.

The system is elongate in a longitudinal direction and generally rectangular, and includes a frame 14 therein so as to be suitably sized and arranged for supporting a standard sized mattress thereon. The frame can be supported on various different types of supporting surfaces. For example, in some instances the supporting surface 13 comprises the floor, or alternatively the supporting surface 13 may be a rigid supporting sheet supported on the top side of a box spring mattress.

In each embodiment there is provided a mattress supporting assembly which includes a support panel 36 in the form of a rigid sheet and one or more mattress panels 48 supported on the support panel 36 by spacers 50 so as to define a crevice between the mattress panels 48 and the support panel 36 corresponding to a height of the spacers. The spacers 50 may be rigid members surrounded by insect harbouring material such as cardboard or burlap as described in further detail below, or alternatively, the spacers 50 themselves may comprise cardboard material with sufficient structural integrity to define a sufficiently sized harboring crevice on their own. A mattress supporting surface 46 is defined by the mattress panels above the support panel so as to be adapted to receive and support the mattress thereon. The crevice is arranged to receive crawling insects therein such that the crawling insects seek harborage in the crevice while traversing the crevice if trying to return to the floor of the surrounding room subsequent to having a meal on the mattress The frame 14 provides the function of a spacer between the supporting surface 13 (for example the floor or the top side of a box spring mattress), and the support panel 36 so as to be arranged to support the support panel of the mattress supporting assembly spaced above the supporting surface 13. The space between the supporting surface 13 upon which the frame 14 is engaged and the support panel 36 is typically occupied by a fibrous material 44 which is treated with either a desiccant material, or a residual pesticide to coat crawling insects which attempt to crawl over or through the fibrous material 44 for treating the insects.

A skirt member 38 extends vertically downward from a perimeter of the support panel 36 of the mattress supporting assembly by a height which is similar to the height of the frame 14 such that a bottom free edge 40 of the skirt member is arranged to be located in proximity to the supporting surface 13 in a non-contacting relationship with the supporting surface 13. The skirt member 38 serves to restrict access to the space defined by the spacer frame 14 which extends vertically between the supporting surface 13 and the support panel 36.

Furthermore, in each embodiment of the bed system, the mattress supporting surface 46 located above the support panel 36 is defined as the top side of the one or more mattress panels 48 which collectively span the top side of the support panel 36. The one or more mattress panels 48 are supported on the support panel in such a manner so as to be moveable between a working position supporting the mattress on the top side thereof and an open position on which the bottom side of the mattress panels and the top side of the support panels are accessible for inspection of crawling insects or any other evidence of the presence of crawling insects such as bedbugs for example.

A plurality of spacers 50 are provided between the mattress panels 48 and the support panel by being loosely supported between the mattress panels 48 and the support panel, or alternatively by being fixed to either the bottom of the mattress panels or the top of the support panel. Loosely supporting the spacers 50 allows ready removal of the spacers for optimal access during treatment. The spacers have a suitable spacing relative to one another so that the mattress panels are adequately supported above the support panel with a uniform gap therebetween which defines a suitable crevice for receiving and harboring bed bugs therein between the mattress panels and the support panel in the working position. The mouth of the crevice extends about the full perimeter of the support panel such that the crevice is typically traversed by bedbugs attempting to reach the support panel from the mattress.

The surface immediately below the crevice about the full perimeter thereof comprises a smooth surface which the insects can crawl over upwardly into the crevice but which is sufficiently slippery to discourage bedbugs from climbing downwardly from the crevice to the portions of the frame below. A suitable surface may be created by providing a varnished edge on the vertical perimeter edge of the support panel. Slippery perimeter edges of the support panel and skirt below the support panel discourage the bed bugs from attempting to climb downward beyond the crevice so that the bed bugs seek harborage in the crevice instead of the surrounding room.

The area above the crevice may comprise a tapered or rounded edge having a smooth radius or transitioning surface from the vertical edge from the perimeter of the mattress panels to the bottom side of the mattress panels to readily encourage bedbugs to enter the crevice from areas above the mattress panels such as the mattress.

Throughout normal use of the bed according to all embodiments, the crevice is periodically inspected by lifting the mattress and moving the mattress panels from the working position to the open position to permit visual inspection of the bottom surface of the mattress panels and the top surface of the support panel.

If any evidence of bedbugs is found in the harbouring crevice, the crevice can be accessed by lifting the mattress panels 48 and directly treating the crevice with steam, alcohol or any other suitable treatment material. When using cardboard as a harbouring material in the crevice, the cardboard and insects harboring therein can simply be disposed of.

Alternatively, the mattress panels may be closed and the mouth of the crevice about the full perimeter thereof is sealed closed, for example by packing tape, such that the support panel and mattress panels thereabove can be removed together as a sealed enclosure for subsequent treatment at a remote treatment location.

If further inspection is desired, removal of the skirt member 34 permits the light coloured frame 14 to be inspected as well as permitting the traps 22 to be inspected and replaced as desired.

Turning now more particularly to the first and second embodiments of FIGS. 1 through 4, the frame includes two rails 16 extending along opposed longitudinal sides of the frame and a plurality of cross bars 18 connected in a lateral direction between the rails including at two longitudinally opposed ends. The first embodiment of the frame further includes four legs 20, located in proximity to the four corners of the frames. The frame is manufactured such that there are no recessed crevices and the surface is light coloured throughout to assist in the inspection for the presence of bedbugs. The legs of the frame are supported on respective trap members 22 such that each trap member is associated with a respective leg of the frame so as to define a crawling insect barrier fully surrounding the leg between the leg and the floor so that crawling insects must traverse the trap member and are trapped on the trap member if attempting to reach the frame from the floor.

Each trap member generally includes a flat panel shaped body 24 including a central portion upon which the leg is arranged to be supported. An annular wall extends vertically upward from the panel 24 about the central portion to receive the leg within the perimeter of the wall 26. An upper surface of the panel 24 about the central portion includes a first annular portion 28 and a second annular portion 30. The first annular portion comprises a horizontal top surface of the panel body which is coated with adhesive in the manner of a glue board trap. The term "annular" is used herein to described any suitably shaped structure that extends about a full circumference in a generally ring shaped endless loop, regardless of whether the resulting loop is round, square, or triangular for example.

In one instance, the adhesive layer is continuous across the first annular portion and the central portion and a cup-like structure having a bottom wall spanning the perimeter wall 26 is adhered onto the adhesive at the central portion upon which the leg of the bed system is then supported.

The second annular portion 30 surrounds the first annular portion and also comprises a horizontal top surface of the panel 24 but the surface is slippery having a low coefficient of friction with no adhesive thereon.

Surrounding the second annular portion is a ramp edge 32 extending about the full perimeter of the panel body 24 in which the upper surface tapers downwardly and outwardly from the first and second annular surface portion to a perimeter edge of the panel body 24 substantially at the floor level.

The bed system of the first embodiment further includes a skirt assembly 34 arranged to be removably engaged upon the frame for enclosing the area below the frame receiving the trap members therein. The skirt assembly 34 in this instance includes the support panel 36 which fully spans the top side of the frame as a continuous rigid sheet. More preferably, the support panel 36 protrudes laterally outwardly beyond the frame 14 about the perimeter thereof.

The skirt assembly 34 defines the skirt member 38 in the form of a rigid vertical wall extending vertically downward to depend from the support panel 36 in proximity to the perimeter edge thereof. The skirt member extends downwardly from the support panel to a bottom free edge 40 in close proximity to the ground at a location spaced laterally and longitudinally outward from all of the trap members receiving the legs of the frame therein such that the trap members are fully enclosed within the area below the frame and bound by the skirt member 38 of the skirt assembly 34.

The skirt member extends along the two longitudinally extending sides of the frame and at least one of the ends extending laterally between the longitudinal sides. The head end of the bed may be against a wall such that no skirt member is required at that location.

In a preferred embodiment, the skirt member 38 is suspended such that the bottom free edge 40 remains spaced above the floor about the full perimeter thereof by a sufficient gap that a crawling insect such as a bedbug cannot crawl across the gap and reach the skirt member from the floor. In other instances however, the skirt member may engage the ground at some locations but the inner and outer surfaces are provided with a surface which is sufficiently smooth to prevent the bedbugs from climbing the surface.

The skirt assembly is supported on the frame such that it is merely engaged on the top side of the frame so as to be arranged for ready removal when desired to inspect the area below the frame where the traps are located. The skirt assembly is thus movable between a working position mounted on the frame with the skirt enclosing the area receiving the trap members therein and an open position in which the skirt assembly is removed from the frame such that the trap members are no longer hidden from view and instead are readily accessible for inspection or replacement as may be desired.

In the working position, the area beneath the frame can be accessed through an access hole 42 extending vertically through the support panel 36 at an intermediate location thereon. The access hole is sufficiently large to provide access for pesticide spraying equipment to distribute pesticide within the enclosed area, however, the access hole is sufficiently small to permit ready sealing in the normal use position.

The enclosed area below the frame may be further provided with a mat 44 of fibrous material engaged upon the floor to span between the legs of the frame. The mat may be comprised of loosely woven fibrous materials which has been roughened to provide an irregular texture of loose fibres at the surface thereof. A residual pesticide coats the fibres of the mat.

Figure 2:
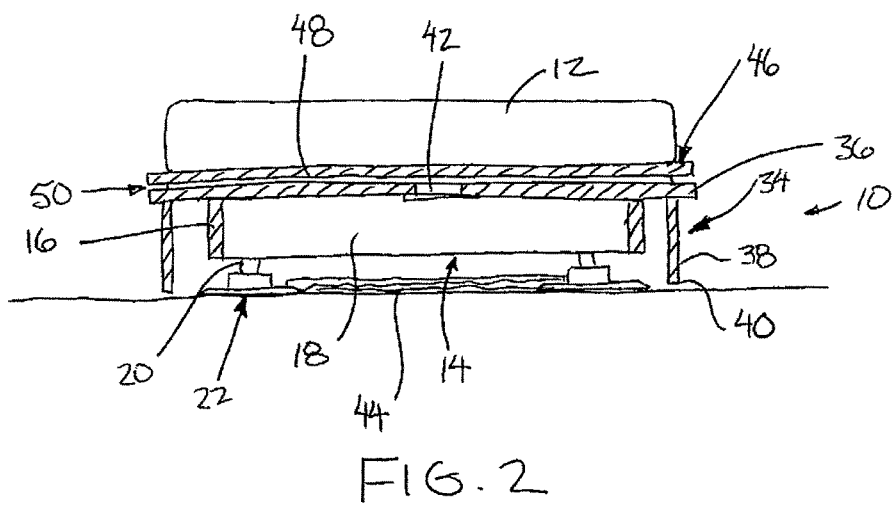
FIG. 2 is a sectional elevational view of the bedbug system in the working position.
Figure 3:
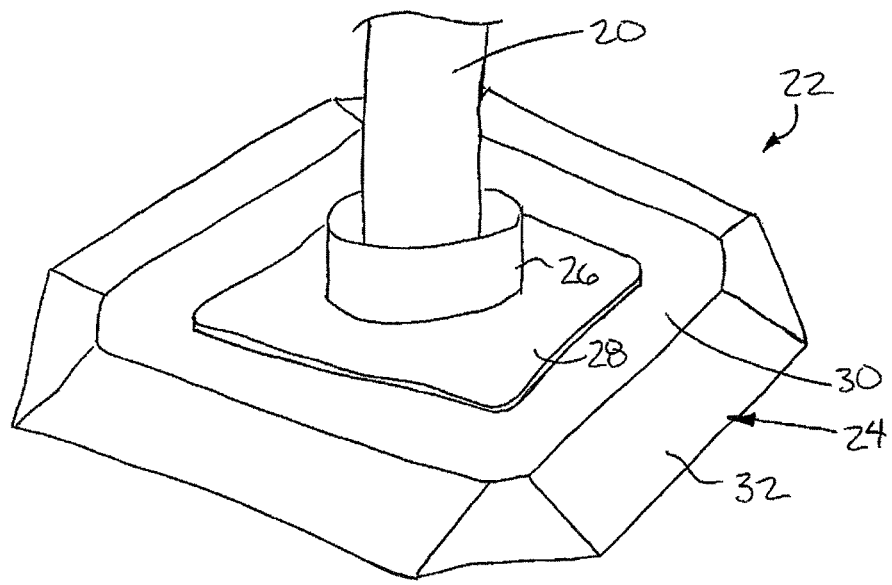
FIG. 3 is a perspective view of one of the trap members.

Turning now more particularly to the first embodiment of FIGS. 1 and 2, the mattress panel 48 in this instance comprises a single panel which fully spans the top side of the support panel. The mattress panel in this instance is simply engaged upon the support panel in a manner that permits the entire mattress panel to be removed for inspection of the area therebetween.

Figure 4:
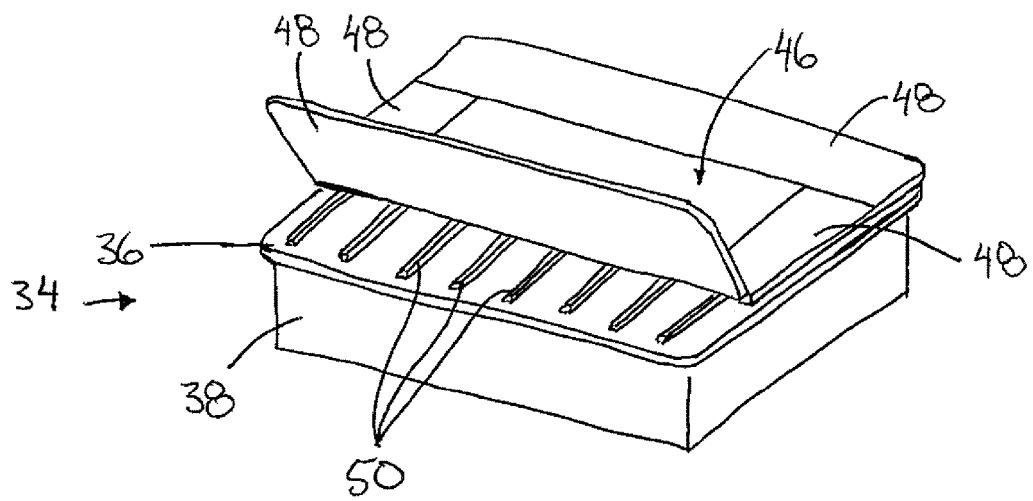
FIG. 4 is a perspective view of a further embodiment of the mattress supporting surface in an open position.

Turning now more particularly to the second embodiment of FIG. 4, in this instance the mattress panels may comprise a plurality of panels abutted with one another to form a continuous panel in the working position. However, some of the panels can be hinged relative to other panels for pivotal movement from the working position to the open position permitting inspection of the surfaces of the crevice therein. The plurality of mattress panels abut one another at respective seams which are arranged to prevent access of bedbugs therethrough either by the close proximity of the abutment or by the use of packing tape and the like across the seams.

Figure 5:
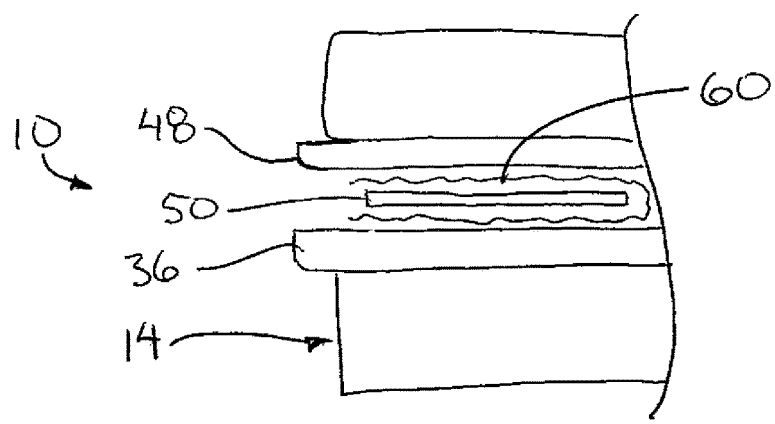
FIG. 5 is a sectional elevational view of an alternative arrangement of the spacers between the support panel and the mattress panel.

In a further embodiment, as shown in FIG. 5, the frame 14 may instead be supported directly on the floor without any legs or traps 22 being used. In this instance, the support panel 36 is supported directly on the frame or is formed integrally as the upper surface of the frame. In some instances of the support panel being supported on a frame, the support panel and the frame upon which it is supported may be fixed in relation to the floor by using various tie-downs or brackets secured to the frame and the floor.

In yet further embodiments, the support panel 36 may be fixed onto various existing mattress frames.

With further reference to the embodiment of FIG. 5, an alternative mounting configuration of the spacers 50 will now be described. In this instance, the mattress panel 48 which supports the mattress 12 thereon is again supported above the support panel 36 by spacers 50 to define a crevice therebetween. The spacers 50 however are layered with a sheet 60 of fibrous material, for example a roughened burlap cloth. More particularly, the sheet 60 may be folded to form a first layer between the spacers 50 and the support panel therebelow and a second layer between the spacers 50 and the mattress panel 48 thereabove. The first and second layers may be joined by a fold at an interior end of the spacers, opposite from the perimeter opening of the crevice area. The fibrous material of the sheet 60 encourages harbouring of bed bugs therein to better access and exterminate the bed bugs when subsequently inspecting the crevice.

In preferred embodiments, the sheet 60 of harbouring material comprises corrugated cardboard sheets.

According to the first and second embodiments, the frame is initially supported on the floor by locating a trap member beneath each one of the legs. The mat 44 with residual pesticide thereon is then placed on the floor surface between the legs. The skirt member 34 is mounted onto the frame such that the area locating the mat of fibrous material and the trap members is fully enclosed by the skirt member and hidden from view to prevent access thereto.

If desired, pesticide is supplied through the access hole 42 to the mat 44 within the enclosed area. The mattress panels are then placed on the support panel with the spacers therebetween to define the harbouring crevice above the support panel and below the mattress supporting surface of the mattress panels. Finally, the mattress is supported on the mattress supporting surface at the top side of the mattress panels.

Figure 7:
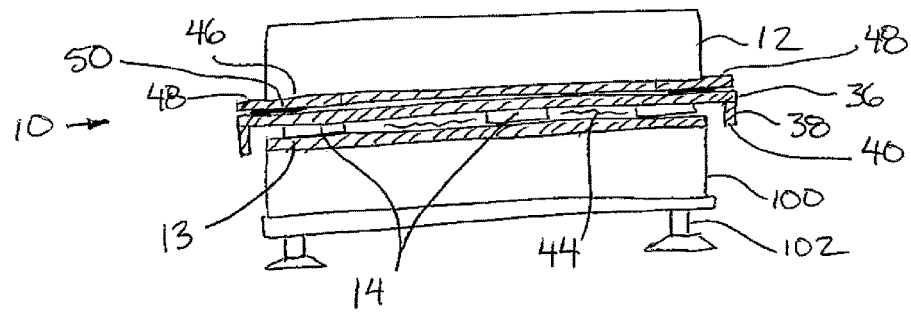
FIG. 7 is a sectional elevational view of the system according to the third embodiment of FIG. 6 in a working position.
Figure 6:
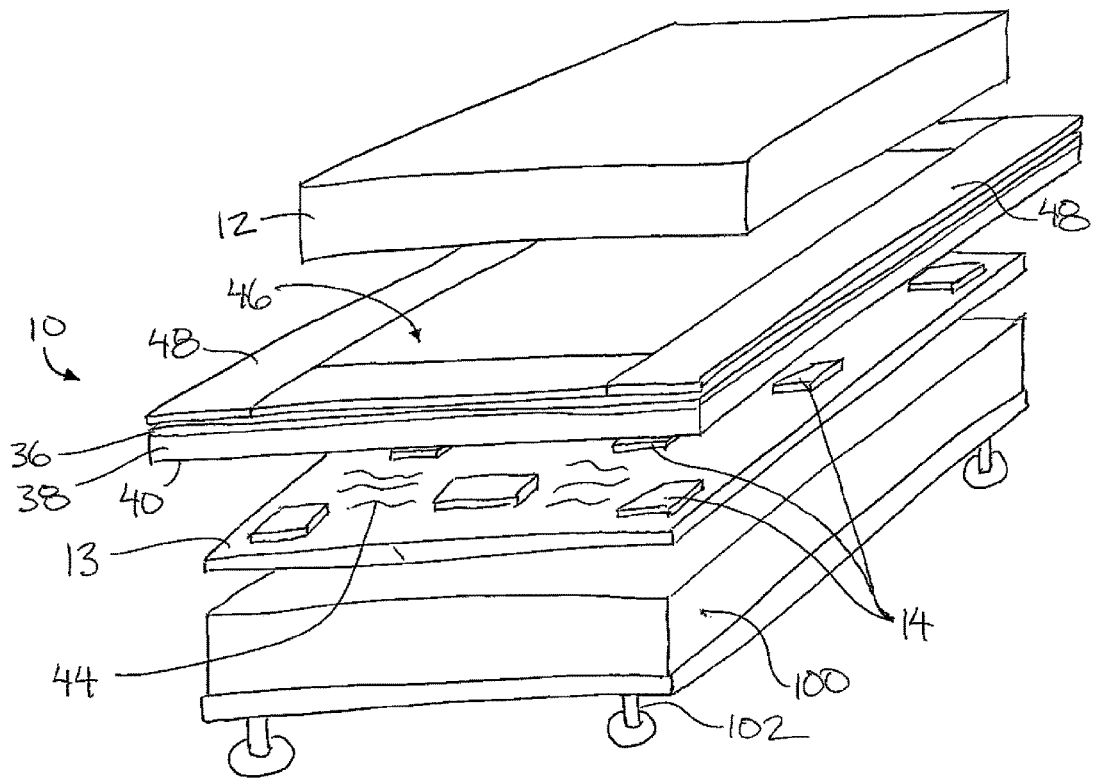
FIG. 6 is an exploded perspective view of a third embodiment of the bedbug system according to the present invention.

Turning now to the embodiment of FIGS. 6 and 7, the bed system in this instance includes the supporting surface 13 which is provided in the form of a rigid rectangular sheet supported horizontally with a length and width corresponding approximately to the length and width of the mattress. For example, the supporting surface may be a sheet of plywood which is fastened to the top side of a box spring mattress 100 which is in turn typically supported on a suitable frame having legs 102 engaged upon the floor. Trap members may optionally be provided about each of the legs 102 as described above with regard to the previous embodiments.

The spacer frame 14 of the system in this instance comprises a plurality of support blocks which are fixed to the top side of the rigid sheet 13 so as to be separate and spaced apart from one another both longitudinally and laterally. The support blocks defining the spacer frame 14 are much greater in length and width than in height. The height in the illustrated embodiment is a minimum height near ½ inch. In the illustrated embodiments, the blocks are rectangular in shape, however, in preferred embodiments, the blocks have a perimeter edge which is free of any sharp corners so as to be round, oval, or any polygonal shape provided that the corners between adjacent flat sides having been rounded off. The upright perimeter edge of the blocks forming the spacer frame 14 in this instance are also formed as a slippery surface, for example by coating with a slippery packing tape.

The support panel 36 in this instance again comprises a rigid structurally supporting sheet which is engaged upon the top side of the frame 14. The sheet forming the support panel is arranged to be longer and wider than the corresponding rectangular dimensions of the rigid sheet forming the supporting surface 13 such that the support panel protrudes horizontally outward in all directions relative to the perimeter edge of the rectangular sheet 13.

The skirt member 38 in this instance is again fixed to the support panel 36 but preferably extends about the full perimeter of the support panel to extend downwardly from both longitudinally extending sides and the two laterally extending ends of the rigid sheet. The skirt member extends downwardly by a height which is near a height of the frame 14. More particularly, the height of the skirt member is equal to a combined height of the frame 14 and the thickness of the rigid sheet forming the supporting surface 13. The resulting bottom free edge 40 of the skirt member is located laterally outward from the corresponding perimeter edge of the rigid sheet 13 and terminates at a bottom end thereof at a location which is lower in elevation than a top side of the sheet such that the skirt member overlaps the edge of the rigid sheet 13 in the vertical direction. The bottom edge of the skirt member remains in close proximity to the perimeter edge of the rigid sheet 13 forming the supporting surface while maintaining a sufficient gap that the crawling insects cannot directly traverse the gap from the perimeter edge of the rigid sheet to the bottom edge of the skirt member. The overlapping arrangement of the skirt member relative to the rigid sheet 13 ensures that there is no direct line of sight from a location external of the skirt member to the horizontal gap provided between the bottom side of the support panel and the top side of the rigid sheet.

The skirt member remains fixed to the support panel, but the support panel is engaged upon the blocks forming the spacer frame 14 in a removable manner. Typically, the support panel is secured in position relative to the frame 14 and the rigid sheet 13 using screws which are fastened through the top side of the support panel into the frame blocks therebelow. The screws remain readily removable for subsequent access to the internal gap between the support panel and the rigid sheet 13.

The compact construction of the rigid sheet forming the support panel 36 and the rigid sheet forming the supporting surface 13 with the small support blocks of the frame therebetween results in an overall height of the bed system in this instance being in the order of 1½ inches for example. In this instance, the bed system is well suited for being positioned between the box spring mattress and the sleeping mattress of a conventional mattress pair.

As in the previous embodiments, the space between the support panel 36 and the supporting surface 13 therebelow, as defined by the frame 14 spanning vertically therebetween, is arranged to receive fibrous material 44 therein which has been coated with a treatment material, for example a desiccant powder or a residual pesticide for example.

The mattress panels 48 in the embodiment of FIGS. 6 and 7 are again supported on the top side of the support panel 36 using spacers 50 as described above to define a crevice for harboring crawling insects therein for monitoring and subsequent treatment also as described above. The mattress panels are again moveable from a closed working position to an open inspecting position.

In both illustrated embodiments noted above, the skirt 38 typically extends about a full perimeter so as to restrict access to the void below the support panel 36 from all sides of the bed, even if the bed is pulled away from the wall. In instances where a headboard is provided, the skirt may only be located along two sides and the foot end of the bed while the head end of the bed is abutted with the headboard. The headboard in this instance must be i) isolated from the floor, for example by fastening to the wall as in a typical hotel room, and ii) isolated from the wall. To isolate the headboard relative to the wall, a spacer can be fastened to the wall to which the headboard is in turn fastened. The spacer is preferably at least four inches smaller than the headboard in width and height. The edges of the spacer are wrapped with slippery packing tape and are then sealed to prevent any access behind the spacer. Accordingly a perimeter of the spacer defines a slippery surface boundary that bugs must cross to access the headboard from the wall. A top side of the spacer is provided with a sharply inclined surface which extends at an upward inclination from the outer side of the spacer that is against the wall to the inner side of the spacer that is joined to the headboard. Any insect attempting to crawl across the top edge will be prevented from reaching the bed by the slippery inclined surface. Other portions of the perimeter of the spacer, including the bottom and laterally opposed sides, may be similarly sloped in addition to being a slippery surface. Strips of clear packing tape can also be stuck on the wall about a perimeter of the spacer. The slippery perimeter boundary prevents the bugs from accessing or leaving the headboard.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of trapping crawling insects comprising:
providing a bed system including i) a frame arranged to be supported on a floor, ii) a support panel on the frame so as to be supported spaced above the floor, iii) a mattress supporting surface supporting at least a portion of a mattress thereon above the support panel, and iv) a plurality of spacers between the support panel and the mattress supporting surface so as to define a crevice between the mattress supporting surface and the support panel of the frame about a full perimeter thereof that the crawling insects must transverse between the support panel of the frame and the mattress on the mattress supporting surface;
inspecting the crevice for the crawling insects by displacing at least a portion of the mattress supporting surface relative to the support panel;
sealing the crevice between the mattress supporting surface and the support panel about the full perimeter; and
transporting the sealed crevice to a remote location for treatment in response to detection of the crawling insects in the crevice.

2. A method of trapping crawling insects comprising:
providing a bed system including (i) a frame arranged to be supported on a floor wherein the frame includes a rigid sheet at a top side thereof, (ii) a support panel on the frame so as to be supported spaced above the floor, (iii) a mattress supporting surface supporting at least a portion of a mattress thereon above the support panel, (iv) a plurality of spacers between the support panel and the mattress supporting surface so as to define a crevice between the mattress supporting surface and the support panel of the frame that crawling insects must transverse between the support panel of the frame and the mattress on the mattress supporting surface, (v) a spacer frame supporting the support panel spaced above the rigid sheet, and (vi) a skirt member suspended from a perimeter of the support panel in which the skirt member has a height which is near a height of the spacer frame such that a bottom free edge of the skirt member is arranged to be located in proximity to a perimeter edge of the rigid sheet of the frame in a non-contacting relationship with the rigid sheet; and inspecting the crevice for crawling insects by displacing at least a portion of the mattress supporting surface relative to the support panel.

3. The method according to claim 2 wherein the rigid sheet has a perimeter edge and wherein the bottom free edge of the skirt member is in proximity to the perimeter edge of the rigid sheet.

4. The method according to claim 3 further comprising supporting the rigid sheet of the frame on a box spring mattress.

5. The method according to claim 3 wherein the skirt member and the mattress supporting surface are removable together from the rigid sheet and the spacer frame supported on the rigid sheet.

6. The method according to claim 3 wherein the spacer frame is fixed relative to the rigid sheet, the skirt member is fixed relative to the support panel, and the support panel is fastened to the spacer frame with removable fasteners.

7. The method according to claim 3 wherein the skirt member is laterally outward in relation to the perimeter edge of the rigid sheet and the bottom free edge of the skirt member is lower in elevation than a top side of the rigid sheet.

8. The method according to claim 2 wherein the support panel is generally rectangular so as to comprise two longitudinal sides and two lateral ends at respective opposing ends of the two longitudinal sides, the skirt member extending along both longitudinal sides and at least one lateral end of the perimeter of the mattress supporting surface.

9. The method according to claim 2 wherein an overall height of the skirt member is less than four inches.

10. The method according to claim 2 including supporting the bottom free edge of the skirt member spaced upwardly from the floor.

11. The method according to claim 2 including supporting the rigid sheet spaced above the floor using a plurality of legs and providing a trap member associated with each leg of the frame so as to define a crawling insect barrier fully surrounding the leg between the leg and the floor.

12. The method according to claim 2 further comprising providing a mat of fibrous material within a gap between the support panel and the rigid sheet.

13. The method according to claim 12 wherein the fibrous material is coated with a material selected from the group consisting of a residual pesticide, and a desiccant material.

14. The method according to claim 2 further comprising at least one mattress panel defining the mattress supporting surface, said at least one mattress panel being supported on the support panel such that the crevice is defined between the support panel and said at least one mattress panel.

15. The method according to claim 14 wherein said at least one mattress panel comprises a plurality of mattress panels abutted with one another at respective seams in a normal working position of the mattress panels such that the crawling insects are unable to pass through the seams.

* * * * *